(12) United States Patent
Noles, Jr.

(10) Patent No.: US 8,308,959 B2
(45) Date of Patent: Nov. 13, 2012

(54) MATERIAL SEPARATOR

(75) Inventor: Jerry W. Noles, Jr., Newcastle, OK (US)

(73) Assignee: Express Energy Operating LP, Houston, TX (US)

( * ) Notice: Subject to any disclaimer, the term of this patent is extended or adjusted under 35 U.S.C. 154(b) by 276 days.

(21) Appl. No.: 12/766,079

(22) Filed: Apr. 23, 2010

(65) Prior Publication Data

US 2011/0259836 A1 Oct. 27, 2011

(51) Int. Cl.
*B01D 21/00* (2006.01)
*B01D 45/02* (2006.01)

(52) U.S. Cl. ..... 210/801; 210/519; 210/521; 210/532.1; 210/539; 210/540; 95/253; 96/182

(58) Field of Classification Search ........... 210/800, 210/801, 802, 519, 521, 532.1, 538, 539, 210/540; 95/253; 96/182, 183, 184
See application file for complete search history.

(56) References Cited

U.S. PATENT DOCUMENTS

| | | | |
|---|---|---|---|
| 1,458,234 A * | 6/1923 | Miller | 210/800 |
| 1,494,670 A * | 5/1924 | Delaney et al. | 210/538 |
| 2,076,815 A | 4/1937 | Fulweiler | |
| 2,883,059 A * | 4/1959 | Puddington | 210/519 |
| 4,396,508 A * | 8/1983 | Broughton | 210/802 |
| 5,837,152 A * | 11/1998 | Komistek et al. | 210/519 |
| 6,099,742 A * | 8/2000 | Komistek | 210/519 |
| 6,533,929 B2 * | 3/2003 | Binsfeld et al. | 210/540 |
| 6,709,500 B1 * | 3/2004 | West | 210/532.1 |
| 7,364,661 B2 * | 4/2008 | Puik | 210/540 |
| 7,429,332 B2 * | 9/2008 | Surjaatmadja et al. | 210/532.1 |
| 7,611,635 B2 * | 11/2009 | Chieng et al. | 210/539 |
| 2002/0153326 A1 * | 10/2002 | Oddie | 210/521 |

FOREIGN PATENT DOCUMENTS

| | | |
|---|---|---|
| WO | WO 9604058 | 2/1996 |
| WO | WO 9852673 | 11/1998 |
| WO | WO 2006/011858 | 2/2006 |

* cited by examiner

*Primary Examiner* — Christopher Upton
(74) *Attorney, Agent, or Firm* — John J. Love; Claude E. Cooke, Jr.; Cooke Law Firm

(57) ABSTRACT

A material separator removes material such as sand from a fluid utilizing an inclined housing having a fluid flow inlet in a lower portion of the housing. Higher density material descends by gravity to a lower wall of the inclined housing and continues to travel down the lower wall portion to a lower section of the housing where it is removed. The remaining fluid which may contain a liquid and a gas is removed from the housing via an outlet at the upper portion of the housing.

11 Claims, 3 Drawing Sheets

MATERIAL SEPARATOR

BACKGROUND OF THE INVENTION

1. Field of Invention

This invention is directed to a device for separating materials of different density, from a flowing stream of fluid which may contain solids, liquids and gases. The device may be readily transported to remote locations such as oil or gas wells to remove solids, for example sand, from fluid that is used at the well site for various purposes and requires treatment after use.

2. Description of Related Art

Currently sand separation equipment is used following fracturing or well stimulation operations. The sand separators are placed in line in front of the choke manifold and other production piping or equipment. This is done in an effort to avoid erosive damage that can be caused by the sand flowing at high velocities through the equipment. In addition some of the equipment can become damaged or plugged up when the sand settles out inside of the equipment piping or pipe lines. This sand can also damage the equipment beyond repair or can result in costly and extensive cleaning operations to the piping and equipment. The equipment that is currently used to filter or separate these contaminates, whether it be sand or other contaminants use one of two technologies.

The first technology uses hydra cyclone separations or basically uses the velocity of the fluid to sling the sand to lower velocity areas where the sand can settle or separate into a catch pot so it may be dumped or purged from the system. The problem with this technology is, for the system to work the fluid has to be accelerated and directed to a flow path that causes a swirling affect that then slings the sand particles to the outside of the flow path. This increase in velocity accelerates the abrasiveness of the sand and requires that the components be made out of materials that can withstand the abrasion. These materials although resistant do not stop the abrasion and only prolong the wear. Once however the components have been worn beyond their design tolerances they lose their effectiveness and the separators cease to work. This failure can be unpredictable and catastrophic. With new drilling technologies the current flow rates and pressures make this method of separation undesirable.

The second technology that is currently used is large vertical columns or settling pots. This technology is much more robust than the first and uses the increased diameter of the settling pots to slow the fluid velocity below the settling rate of the sand. This technology works very well for low fluid rates with large or dense sand particles that are being separated under low pressures. Basically the sand falls out of the fluid at a faster rate than the fluid is being pumped through the assembly. The sand then settles into the bottom part of the assembly and is purged from the system into holding tanks or pits where it can be disposed of. The problem with this technology is the higher the flow rate is, the larger the settling pot has to be for separation to occur. This also holds true for the smaller particles of sand or material as well, the slower it falls through the fluid the less separation that occurs. Therefore these types of separators although robust are not very efficient with higher flow rates and smaller sand particles. The other problem is when using a settling pot, as the pressure increases so does the wall thickness of these pots. Some of these pots are so large that they are difficult to transport and set up and to work on. These vertical columns are also impacted greatly by any type of gas production from the well. Because they rely on reduced velocity for separation to occur anything that causes the velocity to increase can have significant effects on the ability of the separators to work. Therefore as the gas enters into the larger chamber and expands reduced separation occurs and more sand is carried on through the system. In a vertical column the gas races toward the top much as a balloon being released below the water would. This acceleration of gas and fluid caused by high gas flow rates make these separators ineffective in removing contaminates from the fluids.

A variation of the second technology is disclosed in U.S. Pat. No. 7,429,332. A separator is disclosed that includes an inclined vessel having one or more inlet ports 112. The device is designed for solids and liquids. A convection cell 120 forms within the vessel. This device is somewhat effective in separating heavier sand particles in a liquid stream with no gas however it would not be as effective is separating out finer sand particles and in situations where gas is present in fluid. The patent uses the convection effect to cause rotation of the fluid allowing additional retention time for the particle to gravitationally separate from the fluid. This use of convection is slow and not very efficient. It works best on the larger heavier particles and is the reason that in one of the drawings twenty to thirty cells are connected in series and in parallel. This method also generates turbulence within the fluid flow or rotation caused by the convection reducing the effectiveness of the gravitational separation. An indication that this design does not work well with smaller size particles of sand is that in some of the disclosed embodiments a sand filter is used to separate the smaller medium from the fluid mixtures.

BRIEF SUMMARY OF THE INVENTION

The current invention uses the naturally occurring gravitational separation of gases, fluids and solids in a manner that allows the materials to be quickly and efficiently removed from the system. By using this natural gravitational separation the assembly can be much smaller and much more efficient than any of the systems currently in operation. Under the current invention the separator is oriented at an angle to allow the materials which may include gas, fluid, and particulate materials to enter into the assembly on the high side of the assembly and travel along the length of the assembly. This orientation allows the gas to naturally separate from the liquid and sand. This also allows the gas to stay separated while traveling along the entire length of the assembly. Although the gas may travel at a higher velocity than the fluid this separation allows it to travel without affecting either the liquid or the sand velocity. The faster gas travels along the top side of the assembly whereas the fluid travels under that and the heavy particles under that. What this means is that the sand which falls faster through gas moves to the lower portion of the assembly quicker with gas than it does even with fluid. This means that even under higher flow rates the sand is not adversely affected by the velocity of the gas. This affect is further accentuated by the use of velocity shields that are oriented vertically along the bottom portion of the assembly. These shields help to further slow the fluid velocity along the lower portion of the assembly letting the sand fall back to the bottom while being protected from the effect of the higher gas and fluid velocities along the top side of the assembly.

In other words the natural gravitational effect on the fluid and the sand let the sand fall to the low side of the assembly. This means that the sand does not have to fall through the fluid column that is traveling in the opposite direction from the particles decent. The sand need only transport to the lower wall of the separator. This significantly reduces the amount of time that it takes for the sand particle to reach the bottom of the assembly. In relationship to a vertical column where the sand is falling at a rate of 20 ft. per minute and the fluid might be lifting the sand at a rate of 17 ft. per minute the net rate of settling is 3 ft. per minute this means that on a 15 ft. vertical column it will take the sand 5 minutes to reach to bottom. In this invention at the same settling rate the sand will reach the low side of the separator in approximately 1.9 seconds. This allows the sand to not only be removed from the assembly faster but means that there is less sand entrained in the fluid for any moment in time. This improved efficiency based on time and settling rates allows the assembly to handle much higher volumes of fluids and sand using a smaller diameter than the other systems. This lower weight and size is important when it comes to handling and transport of the assembly. The larger vertical columns had to be laid down and transported to location because of their great size. In this embodiment of the invention once the sand has reached the low side of the assembly the velocity shields protect the sand from the gas and fluid flow. The velocity shields provided sufficient clearance between them and the wall of the assembly as to allow the sand enough room to slide down into the collection chamber at the lowest point in the interior of the assembly. Once the accumulated sand has reached the collection chamber it can then be dumped or purged from the system to a holding tank or pit.

The invention may also be used to separate any material out, either solids or liquids, where gravitational density separation can be applied.

DETAILED DESCRIPTION OF THE INVENTION

Figure 1:
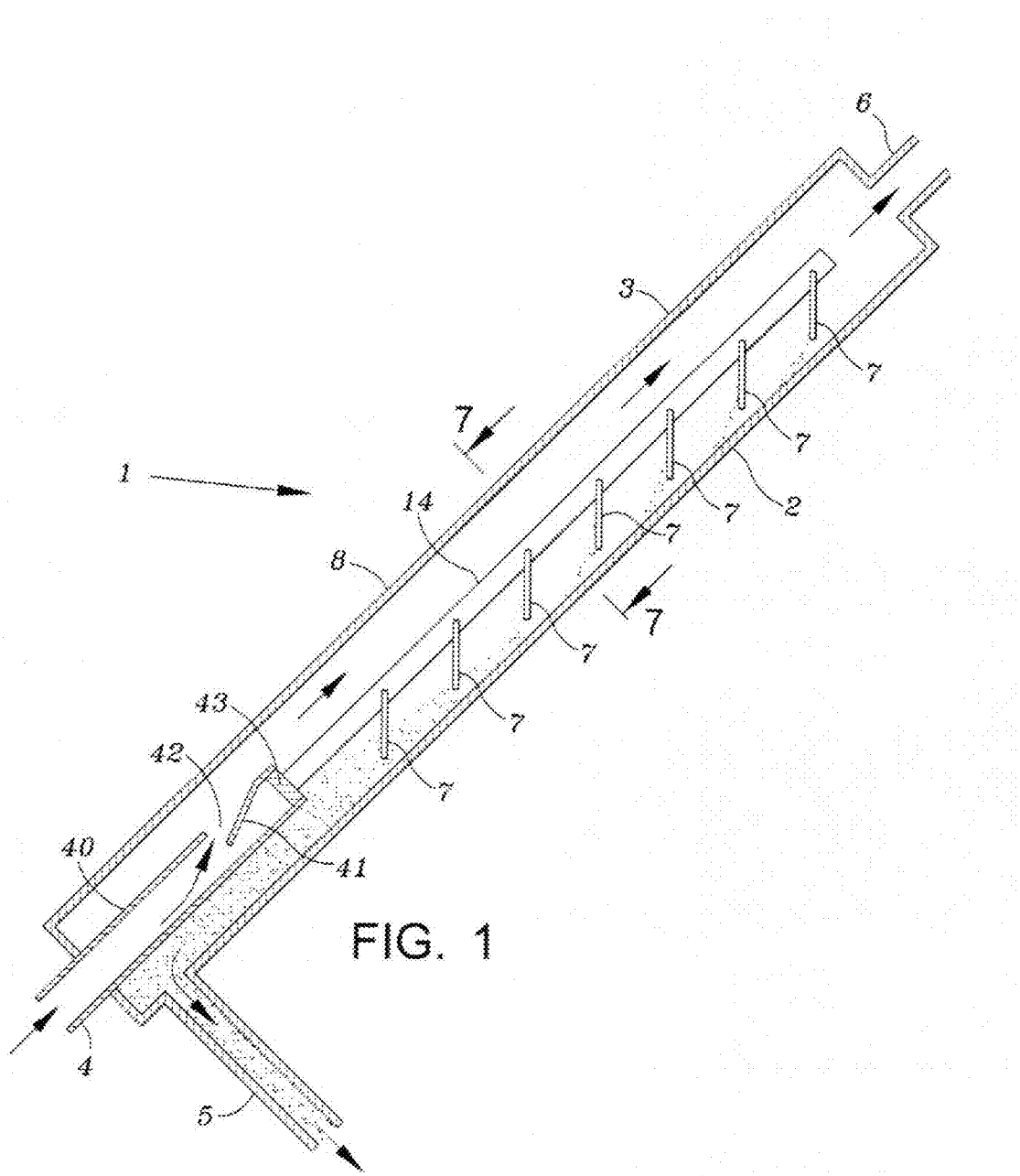
FIG. 1 is a cross sectional view of an embodiment of the invention.

FIG. 1 illustrates an embodiment of the invention and shows a view of a separator 1. A plurality of separators may be connected to common manifolds for the input fluid, particle removal, and for the output fluid. The separator includes a first elongated body portion 8 having an upper side wall 3 and a lower side wall 2. In use the separator is inclined with respect to the horizontal at an angle of about, but not limited to, twenty to seventy degrees.

The separator body 8 may be a cylindrical tube having an inlet 4 at the lower portion, an outlet 5 in the lower portion for removal of the separated material, for example sand, and an outlet 6 in an upper portion for the liquid and any gas that may be present in the fluid introduced at the bottom of the body.

Figure 3:
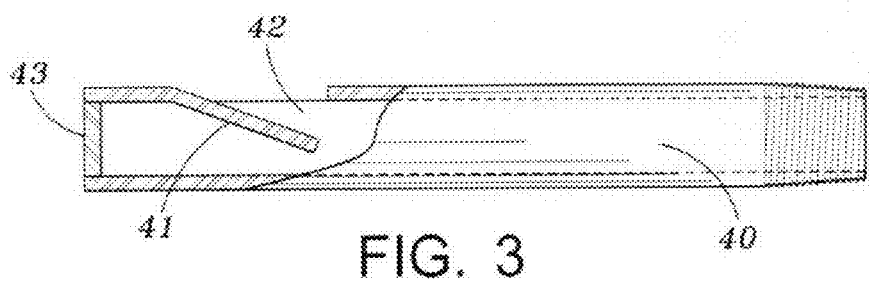
FIG. 3 is a side view of the internal fluid injector.
Figure 5:
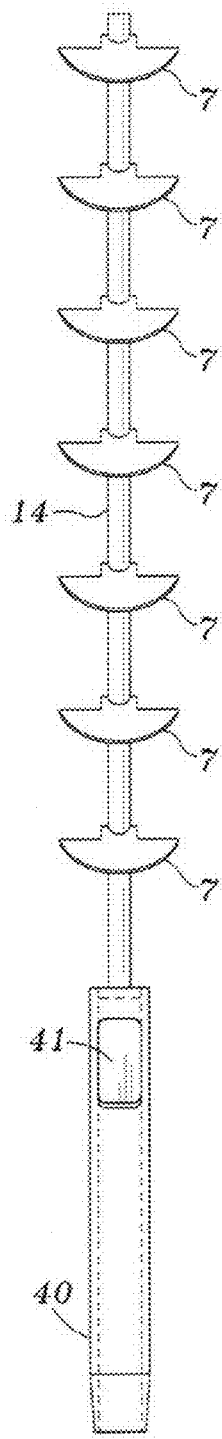
FIG. 5 is a top view of the internal fluid injector and velocity shield assembly.

A cylindrical pipe 40 is connected to the inlet 4 and is secured within the body 8. As shown in FIGS. 3 and 5, the wall of the pipe has an outlet 42 formed by cutting a U-shaped slot in the wall and then bending the wall inwardly at 41. A closing cap 43 is secured over the upper end portion of pipe 40. Thus as shown in FIG. 1, fluid enters the interior portion of the separator through inlet 4, pipe section 40, and outlet 42 and is directed upwardly toward upper side wall 3.

Figure 4:
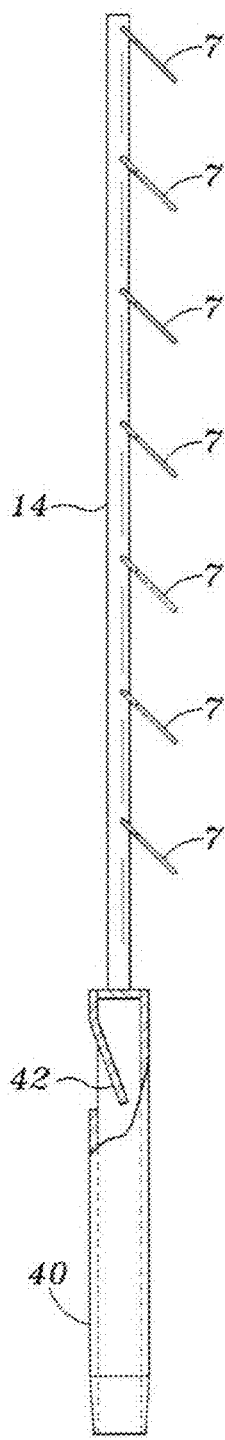
FIG. 4 is a side view of the internal fluid injector and velocity shield assembly.
Figure 6:
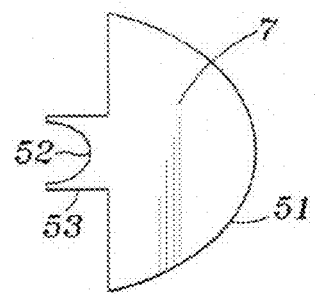
FIG. 6 is a top view of one of the velocity shields.
Figure 7:
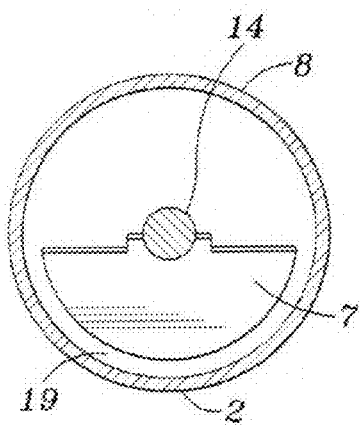
FIG. 7 is a view taken along line 7-7 of FIG. 1 showing the position of a velocity shield within the separator.

A solid rod 14 extends from the closing cap 43 and is suitably supported within the housing 8. A plurality of velocity shields 7 are provided to retard the flow of fluid along the bottom portion of the housing. They may extend downwardly from the shaft at an angle of about forty five degrees. However this angle is not critical. Each shield includes a paddle portion 51 as shown in FIG. 6 and a projection portion 53 having a notch 52 which allows the shield to be secured to rod 14. As shown in FIG. 7, paddle portion 51 is spaced from the lower side portion 2 to form a passageway 19 for liquid and to allow the material to move downwardly along lower sidewall 2. FIGS. 4 and 5 illustrate the position of the shields on the support shaft 14.

In operation, fluid containing material to be separated which may be the result of fracturing or other well stimulation operations in the field is directed through inlet 4, pipe 40, and outlet 42 into the upper, interior region of housing 8. At this point any gas in the fluid begins to separate out and travels along the upper side wall 3. A mixture of the gas, liquid and other material tends to form at the center portion of the tubular member and higher density material separates out due to gravity at the lower side wall 2 and falls downwardly where it can be removed through outlet 5. Velocity shields 7 slow the fluid velocity along the lower portion of the separator which enhances the settling of the higher density material and protects this portion of the fluid from the effect of the higher gas and liquid velocities along the upper portion of the assembly. Any gas present in the fluid along with liquid exits the separator at outlet 6 and may be directed to a suitable location such as a storage or transportation tank.

Figure 2:
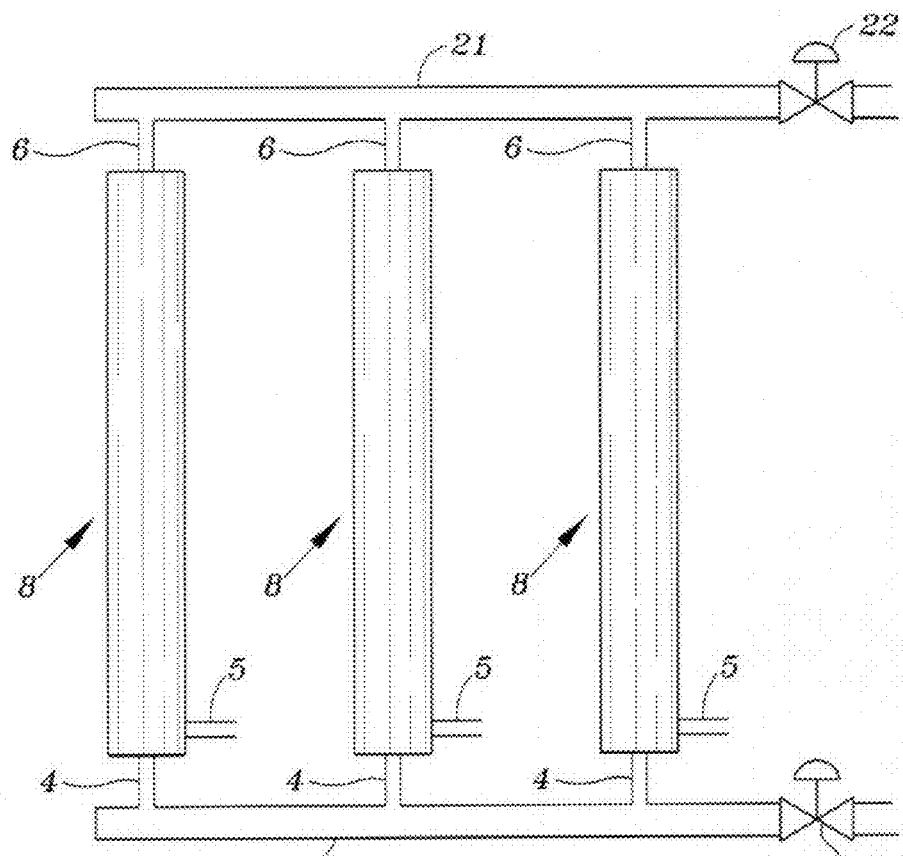
FIG. 2 is a perspective view of a plurality of separators connected together to form a single unit.

As shown in FIG. 2, a plurality of separator units 8 may be connected in parallel by providing an inlet manifold 31 having a valve 30, an outlet manifold 21 having an outlet valve 22, and a plurality of material outlets 5 connected to a common manifold. In use, the separator is supported by any conventional means in an inclined position on a support frame or on a vehicle.

The foregoing description of an embodiment of the invention is for purposes of explaining the nature of the invention and is not intended to be limiting. Various modifications to the specific structure shown would be apparent to those skilled in the art without departing from the essence of the invention, which is defined in the accompanying claims.

Although the present invention has been described with respect to specific details, it is not intended that such details should be regarded as limitations on the scope of the invention, except to the extent that they are included in the accompanying claims.

I claim:

1. A separator for separating solid material from a fluid comprising:

an elongated inclined housing having an inlet for fluid, an outlet in an upper portion of the housing and an outlet for separated solid material at a lower portion of the housing;

a fluid discharge outlet within a lower portion of the housing for directing fluid toward an upper side wall of the housing; and means for retarding the flow of fluid positioned within the housing vertically above the fluid discharge outlet and extending downwardly to a position adjacent a lower wall of the housing to allow separated solid material to fall downwardly along the lower wall of the housing to the outlet for separated solid material.

2. The separator of claim 1 wherein the means for retarding the flow of fluid includes one or more velocity shields comprising a paddle portion and a projection having a notch therein for securing the shield within the housing.

3. A separator according to claim 2 wherein the paddle portion comprises an arcuate plate.

4. A separator according to claim 2 further comprising a rod extending within the housing, the velocity shields extending downwardly from the rod.

5. A separator according to claim 1 wherein the housing is a circular tube and the fluid discharge outlet is located in a centrally located pipe in fluid communication with the inlet, the discharge outlet being located in an upper portion of the pipe wall to direct the fluid in an upward direction.

6. Apparatus for separating solid material from a fluid comprising a plurality of separators as claimed in claim 1, an inlet manifold connected to each separator inlet, and an outlet manifold connected to each separator fluid outlet.

7. The separator according to claim 1 wherein the means for retarding the flow of fluid is spaced from the lower wall of the housing thereby forming a passageway for the solid material to fall downwardly.

8. The separator according to claim 1 wherein the means for retarding the flow of fluid comprises a plurality of axially spaced planar member that are supported within the housing and have a lower end that is adjacent to but spaced from the lower wall of the housing.

9. A method of separating solid material from a fluid which may contain liquids, solids and gases comprising:
   directing the fluid through a discharge outlet in an upwardly direction within an elongated housing that is supported at an incline;
   providing a separated solid material outlet in a bottom portion of the housing;
   providing a fluid outlet in an upper portion of the housing; and
   retarding the flow of fluid in a downward direction by placing one or more velocity shields vertically above the discharge outlet, the velocity shield extending downwardly to a position adjacent a lower wall portion of the housing to allow separated solid material to fall downwardly along the lower wall portion of the housing to the outlet for separated solid material.

10. The method according to claim 9 wherein the fluid contains solid material, a liquid and a gas.

11. The method of claim 9 including a plurality of axially spaced velocity shields that are planar members having a lower end adjacent to but spaced from the lower wall of the housing thereby forming a passageway for the solid material to fall downwardly.

* * * * *